(No Model.)

G. STEVENSON.
BROADCAST SEED SOWER.

No. 356,698. Patented Jan. 25, 1887.

WITNESSES
W. R. Davis
H. G. Dieterich

INVENTOR
George Stevenson
per Fred. G. Dieterich, Attorney

UNITED STATES PATENT OFFICE.

GEORGE STEVENSON, OF ZIONSVILLE, INDIANA.

BROADCAST SEED-SOWER.

SPECIFICATION forming part of Letters Patent No. 356,698, dated January 25, 1887.

Application filed June 9, 1886. Serial No. 204,627. (No model.)

*To all whom it may concern:*

Be it known that I, GEORGE STEVENSON, a citizen of the United States, residing at Zionsville, in the county of Boone and State of Indiana, have invented certain new and useful Improvements in Broadcast Seed-Sowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in an improved broadcast seed-sower in which by reciprocating a bow of the usual construction provided with a double cord the scattering-wheel is revolved continuously in one direction through the mechanism hereinafter described, and in which, also, I provide means for saving one-fifth of the seed, which would otherwise be wasted and lost, all as will be hereinafter fully described and claimed.

Figure 1:
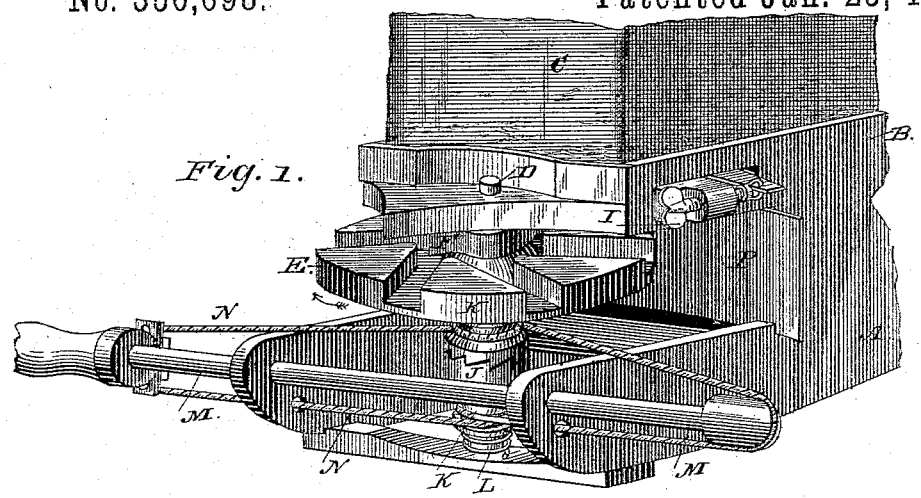
Figure 2:
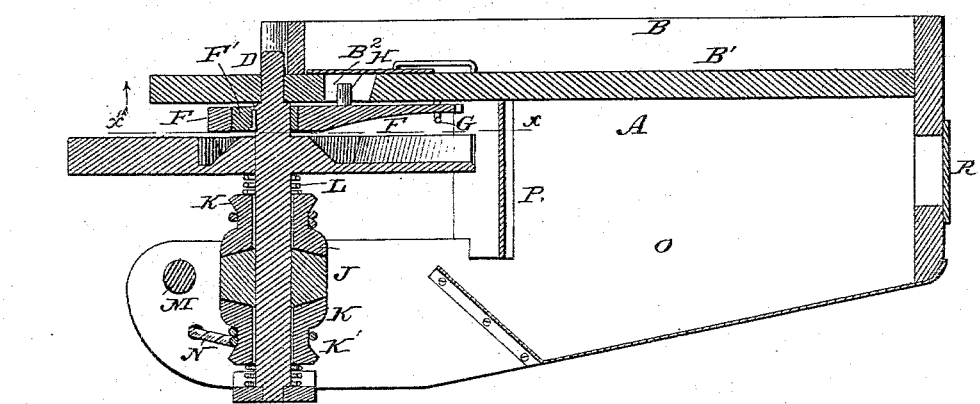
Figure 3:
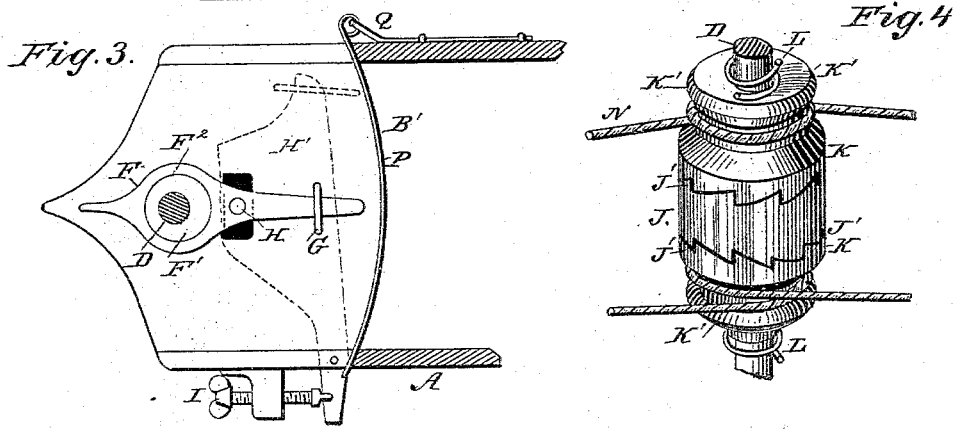
Figure 4:
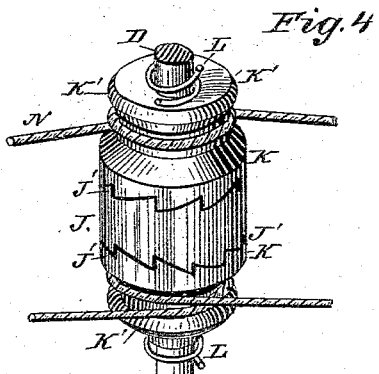

Referring to the accompanying drawings, Figure 1 is a perspective view of my improved broadcast seed-sower. Fig. 2 is a longitudinal vertical central sectional view of the same. Fig. 3 is a horizontal sectional view taken on line $x\ x$, Fig. 1, and Fig. 4 is a detail perspective view of the ratchet-wheels on the shaft of the scattering-wheel.

The same letters of reference indicate corresponding parts in all the figures.

Referring to the several parts by letter, A indicates the main frame, the upper portion of which forms the hopper B, having the partition or bottom B', and upon this wooden hopper I secure the canvas bag C, which forms the upper portion of the hopper in which the grain is held. In the front end of the frame A is journaled the vertical shaft D, upon which is tightly keyed, near its upper end, the scattering-wheel E, which may be of any suitable and desired construction, and which passes beneath the forward portion of the bottom of the hopper, so as to receive the seed which falls from the hopper through an opening, $B^2$, in the bottom of the same; and to prevent the seed from clogging up this feed-opening in the bottom of the hopper I secure upon the shaft D, immediately above the scattering-wheel E, an eccentric, F', which fits and turns in a circular opening, $F^2$, in the forward portion of a plate, F, the reduced rear end of which slides in a guide, G, while it is provided to the rear of its aperture $F^2$ with an upwardly-extending finger, H, which extends up within the feed-opening in the bottom of the hopper; and it will be seen that as the wheel-shaft is revolved, as hereinafter described, the said finger will be vibrated in the said feed-opening so to effectually prevent the seed from clogging therein, as will be readily understood. The amount of seed or grain fed down through the feed-opening is regulated by a slide or gate, H', which is opened and closed by the set-screw I, by means of which the gate can be accurately adjusted to regulate the amount of grain passing through the feed-opening.

Upon the central portion of that part of the shaft D between the scattering-wheel and its lower end is tightly secured a double ratchet-wheel, J, having teeth J' on both sides, as shown, inclined in the same direction, while above and below this double ratchet-wheel are loosely mounted upon the shaft D the single ratchet-wheels K K, having the teeth on their inner facing sides inclined in the same direction, as shown, and being formed each with the annularly-grooved hubs K', and these single ratchet-wheels are held normally in engagement with the central double wheel by the coiled springs L, arranged as shown.

M represents the reciprocating rod or bow, to the ends of which are secured the double cord N, the central portion of each cord being wound once around the grooved hub of its ratchet-wheel, the cords passing around the ratchet-wheels in opposite directions, as clearly shown in the drawings, the result of this arrangement of the drive-cords being that as the bow is drawn in one direction the ratchet-wheels will be revolved in opposite directions, as indicated by the arrows in Fig. 1, the same result of course following when the motion of the rod is reversed.

It will be seen that in operation, when the operator draws the reciprocating rod back and forth, on each stroke of the bow one of the two loose ratchet-wheels will engage with the teeth of the central double ratchet-wheel secured upon the shaft, thereby revolving the shaft and scattering-wheel rapidly, while the other loose ratchet-wheel, being revolved in the opposite direction, will slip over the teeth of the central fixed ratchet-wheel in the opposite direction to that in which the said central wheel is being rotated, while on the reverse stroke the direction of the loose ratchet-wheel is reversed, and the one then turned in the direction in which the shaft was revolved on the previous stroke will engage with the teeth of the central wheel, and thus continue the revolution of the shaft in one direction, while the other loose wheel will be revolved in the opposite direction, slipping over the teeth of the central wheel.

From the foregoing description, taken in connection with the accompanying drawings, it will be seen that by this mechanism I obtain a rapid and continuous revolution of the scattering-wheel in one continuous direction while reciprocating the bow in the usual manner, this continuous revolution of the wheel in one direction serving to scatter the seed or grain evenly and equally, as there are no sudden stops and reverse movements of the scattering-wheel, which occur where the wheel is reversed with each stroke of the bow, as is now the case.

Instead of the bands or cords here shown, I may employ cogged racks fitting into cogs or teeth formed on the hubs of the loose ratchet-wheels, which would produce precisely the same result, without departing from the spirit of my invention. This mechanism for revolving a shaft or wheel in one continuous direction by means of a reciprocating rod may be employed for running any kind of machinery. For example, I can obtain a direct and continuous revolving motion from the piston-rod of an engine and dispense with the usual crank.

That portion of the main frame A below the bottom of the hopper forms a box or receptacle, O, having a closed bottom and rear end, the forward end of this receptacle, directly opposite the scattering-wheel, being left open when sowing valuable seeds—such as clover, &c.—and as the scattering-wheel in its rapid revolution distributes the seed in all directions—that is, in a perfect circle—it will be seen that one-fifth of the seed will be caught and retained in this box or receptacle, which would otherwise be distributed on the ground which had already been planted by seed thrown forward by the scattering-wheel, thereby sowing a large portion of the ground double and throwing away and wasting fully one-fifth of the valuable seeds being sown, while the box or receptacle of my improved seed-sower catches and prevents from falling on the ground already sown all of the seed thrown from the wheel as it passes the box, thereby saving the farmer from a dead loss of one-fifth of the valuable seeds being sown, which is a most important point. When the larger grains—such as corn—are being sown, I preferably close the forward end of the box by means of the curved slide P, which is held in place by the spring-catch Q on the side of the box. It will be seen that when the forward end of the box is left open only four-fifths of the wheel are throwing seed upon the ground, the other fifth of the wheel throwing its seed into the box as it passes the open mouth of the same, and when a sufficient quantity of seed has been collected in the box the gate R at the rear end of the same is opened and the seed poured out and replaced in the hopper.

Having thus described my invention, what I claim, and desire to secure by Letters Patent of the United States, is—

1. The combination, with the hopper having the feed-opening, of the vertical shaft carrying the scattering-wheel and having secured upon its lower portion the double ratchet-wheel having its teeth on both sides inclined in the same direction, the loosely-mounted ratchet-wheels having the grooved hubs, the spiral springs arranged as described, and the bow having the double cord wound once around the said grooved hubs in opposite directions, substantially as set forth.

2. As an improvement in broadcast seed-sowers, the combination, with a scattering-wheel and suitable means for operating the same, of a box or receptacle having an open forward end and arranged to catch that portion of the seed thrown to the rear of the said wheel.

3. The combination, with the main frame forming the box or receptacle closed with the exception of its forward end, and having the discharge-opening in its rear end and the sliding gate closing the same, of the shaft journaled in the forward end of the main frame and carrying the scattering-wheel, and means, substantially as described, for rotating the same.

4. The combination, with the main frame forming the box or receptacle closed with the exception of its forward end, and having the discharge-opening in its rear end and the sliding gate closing the same, of the shaft journaled in the forward end of the main frame and carrying the scattering-wheel, means, substantially as described, for rotating the same, and the removable slide for closing the forward end of the box when desired, and the spring-catch for holding the same in position.

In testimony whereof I affix my signature in presence of two witnesses.

GEORGE STEVENSON.

Witnesses:
   his
 JOHN + PITTMAN,
   mark.
 JOHN F. STEPHENSON.